(12) United States Patent
Beheydt et al.

(10) Patent No.: US 10,924,812 B2
(45) Date of Patent: Feb. 16, 2021

(54) CONSTANT QUALITY VIDEO ENCODING WITH ENCODING PARAMETER FINE-TUNING

(71) Applicant: Cisco Technology, Inc., San Jose, CA (US)

(72) Inventors: Samie Beheydt, Geluwe (BE); Joel Warren Schoenblum, Alpharetta, GA (US); Sangeeta Ramakrishnan, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 36 days.

(21) Appl. No.: 15/897,376

(22) Filed: Feb. 15, 2018

(65) Prior Publication Data

US 2019/0253763 A1 Aug. 15, 2019

(51) Int. Cl.
| | |
|---|---|
| *H04N 7/173* | (2011.01) |
| *H04N 21/6379* | (2011.01) |
| *H04N 21/24* | (2011.01) |
| *H04N 21/2662* | (2011.01) |
| *H04N 21/2343* | (2011.01) |

(52) U.S. Cl.
CPC ..... *H04N 21/6379* (2013.01); *H04N 21/2343* (2013.01); *H04N 21/2402* (2013.01); *H04N 21/2662* (2013.01)

(58) Field of Classification Search
CPC ........... H04N 21/6379; H04N 21/2343; H04N 21/2402; H04N 21/2662
USPC ........... 725/116; 375/240.02, 240.03, 240.28
See application file for complete search history.

(56) References Cited

U.S. PATENT DOCUMENTS

| | | | | |
|---|---|---|---|---|
| 9,615,098 | B1* | 4/2017 | Yi ........................ | H04N 19/179 |
| 2007/0204067 | A1* | 8/2007 | Walker ................. | H04N 19/196 |
| | | | | 709/247 |
| 2013/0058393 | A1* | 3/2013 | Soroushian ...... | H04N 21/23439 |
| | | | | 375/240.01 |
| 2013/0094564 | A1* | 4/2013 | Yang .................... | H04N 19/154 |
| | | | | 375/240.02 |
| 2014/0241420 | A1* | 8/2014 | Orton-Jay ............ | H04N 19/176 |
| | | | | 375/240.03 |
| 2014/0269936 | A1* | 9/2014 | Shivadas .............. | H04N 19/177 |
| | | | | 375/240.26 |
| 2015/0288965 | A1* | 10/2015 | Li ........................ | H04N 19/124 |
| | | | | 375/240.03 |

(Continued)

*Primary Examiner* — Mulugeta Mengesha
(74) *Attorney, Agent, or Firm* — Merchant & Gould P.C.

(57) ABSTRACT

Constant quality video encoding with encoding parameter fine-tuning may be provided. First, an aggregation window comprising a plurality of video frames from a transport stream may be determined. Next, a plurality of video quality values may be determined where the plurality of video quality values indicate a video quality for corresponding respective ones of the plurality of video frames in the aggregation window. Then a determined conformance rate value for the aggregation window may be determined. The determined conformance rate value may indicate a number of the plurality of video quality values that have one of the following characteristics: equal to the target video quality value and greater than the target video quality value. The determined conformance rate value may then be used to adjust at least one of the encoding parameters used in the constant quality encoding of the source.

20 Claims, 5 Drawing Sheets

(56) References Cited

U.S. PATENT DOCUMENTS

| | | | |
|---|---|---|---|
| 2016/0205164 A1* | 7/2016 | Schmidt | H04L 1/0001 709/219 |
| 2018/0068195 A1* | 3/2018 | Kolarov | G06K 9/3233 |
| 2019/0045194 A1* | 2/2019 | Zavesky | H04N 19/142 |

* cited by examiner

CONSTANT QUALITY VIDEO ENCODING WITH ENCODING PARAMETER FINE-TUNING

TECHNICAL FIELD

The present disclosure relates generally to Adaptive Bitrate (ABR) streaming.

BACKGROUND

Adaptive Bitrate (ABR) streaming is a method of video streaming over Hypertext Transfer Protocol (HTTP) where the source content is encoded at multiple bitrates, then each of the different bitrate streams are segmented into small multi-second or sub-second parts. The streaming client is made aware of the available streams at differing bitrates, and segments of the streams by a manifest file. When starting, the client typically requests the segments from the lowest bitrate stream. If the client finds the download speed is greater than the bitrate of the segment downloaded, then it may request the next higher bitrate segments. Later, if the client finds the download speed for a segment is lower than the bitrate for the segment, and therefore the network throughput has deteriorated, then it may request a lower bitrate segment. The segment size can vary depending on the particular implementation, but they are typically between two and ten seconds.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Constant quality video encoding with encoding parameter fine-tuning may be provided. First, an aggregation window comprising a plurality of video frames from a transport stream may be determined. Next, a plurality of video quality values may be determined where the plurality of video quality values indicate a video quality for corresponding respective ones of the plurality of video frames in the aggregation window. Then a determined conformance rate value for the aggregation window may be determined. The determined conformance rate value may indicate a number of the plurality of video quality values that have one of the following characteristics: equal to the target video quality value and greater than the target video quality value. The determined conformance rate value may then be used to adjust at least one of the encoding parameters used in the constant quality encoding of the source.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Adaptive Bitrate (ABR) video may be encoded as Constant Bitrate (CBR) where the ABR video profiles may have a certain fixed bitrate. One disadvantage of CBR encoding is that the video quality of the encoded video depends on the actual video content source. Embodiments of the disclosure may encode ABR video where the ABR video profiles may have a Constant Quality (CQ) instead of CBR for example. CQ may provide an encoding where the video quality of the service may remain constant over time.

With CQ encoding, it may be difficult to make the encoding purely CQ with the encoding being uncapped in terms of bitrate. This is because a cap on the bitrates may be used so that delivery of the video becomes practically feasible and clients have an idea of what rates to expect for the ABR profiles. Accordingly, embodiments of the disclosure may provide an optimization (i.e., fine-tuning) of multiple parameters, for example, a target video quality value and a bitrate cap value.

When an ABR set of profiles is defined (e.g., where each profile may have a certain resolution, framerate, and bitrate) the bitrate of the profiles may be a compromise that may provide reasonable video quality for most of the video content that is encoded. Because the bitrate selection of the profiles may be a compromise, the profile bitrate may be too high for very easy content and may be too low for more challenging content. For example, a newsreader (e.g., easy content) encoded as an ABR profile of 1280×720p59.94@3000 kbps may provide a very good video quality. However, a sports game (e.g., more challenging content) that is difficult to encode may not provide a good video quality for the same 1280×720p59.94@3000 kbps ABR profile and may use a higher bitrate for good video quality. In this example, a problem may arise in that, for the more easy content, bandwidth may be wasted (because the content may look equally good at lower bitrate); however, for the more challenging content, video quality may not be good enough.

One way to solve this problem may be to encode the ABR profiles at CQ instead of CBR. Encoding at CQ may comprise the video encoder adapting the video bitrate to the actual video content (i.e., source) that is being encoded to reach a pre-configured target video quality. As a result, for the same target video quality, the easy content may be encoded at lower bitrate while the more challenging video content may be encoded at higher bitrate. One problem with defining a target video quality for a CQ encoder may be that the video bitrate may peak very high for the more challenging content. Accordingly, the peak video bitrate of the CQ encoder may be limited by defining a predetermined bitrate cap value. Consequently, for ABR profiles that may be CQ encoded, two encoding parameters may be used: i) a target video quality value; and ii) a bitrate cap value. If the target video quality value is chosen too high and the bitrate cap value is chosen too low, the video quality target may not be reached (e.g., depending on the source video content). If the target video quality value is chosen too low and the bitrate cap value is chosen too high, the bitrate cap value may not be reached and the video quality of the encoded video may not be optimal. Embodiments of the disclosure may include a process that may fine-tune (i.e., adjust) and provide a well-balanced combination of these two values (i.e., the target video quality value and the bitrate cap value).

If performed manually, the process that may fine-tune and provide the well-balanced combination of these two values may be time-consuming if this process is done for each ABR profile of each video channel. Consequently, the amount of work done for all channels may increase exponentially with the number of video channels. Furthermore, this may be done quickly when the video source corresponds to live-content. Accordingly, a manually process may not be feasible.

Embodiments of the disclosure may optimize the encoding parameters comprising the target video quality value and the bitrate cap value. The CQ encoder may start with an initial target video quality value and an initial bitrate cap value. Then, while performing the CQ encoding, the encoder may provide statistics on the encoding process. These statistics may comprise the actual video quality values of the encoded video frames. As described in greater detail below, these statistics may then be used to fine-tune the target video quality value and the bitrate cap value to meet a pre-defined goal. An example of the pre-defined goal may comprise that the video quality target is met 80% of the time, which means that 80% of the video frames have a video quality value that is equal to or greater than the target video quality value.

Because the encoding parameters may comprise two parameters (e.g., the target video quality value and the bitrate cap value), there may be two use-cases for providing constant quality video encoding with encoding parameter fine-tuning consistent with embodiments of the disclosure. The first use-case may be where the bitrate cap value may be pre-defined. In this first use-case, the target video quality value may be adjusted in such a way that the video quality target may be met at a predetermined amount of time (e.g., 80% of the time). The video quality target may change over time because of a change in the video content source (i.e., change from an easy video content source (e.g., a newsreader) to a more challenging video content source (e.g., a sports game) or vice versa). The second use-case may be where the video quality target may be pre-defined and kept constant. In this second use-case, the bitrate cap value may be adjusted in such a way that the video quality target may be met at a predetermined amount of time (e.g., 80% of the time). The bitrate cap value may change over time because of a change in the video content source (i.e., change from an easy video content source (e.g., a newsreader) to a more challenging video content source (e.g., a sports game) or vice versa).

Figure 1:
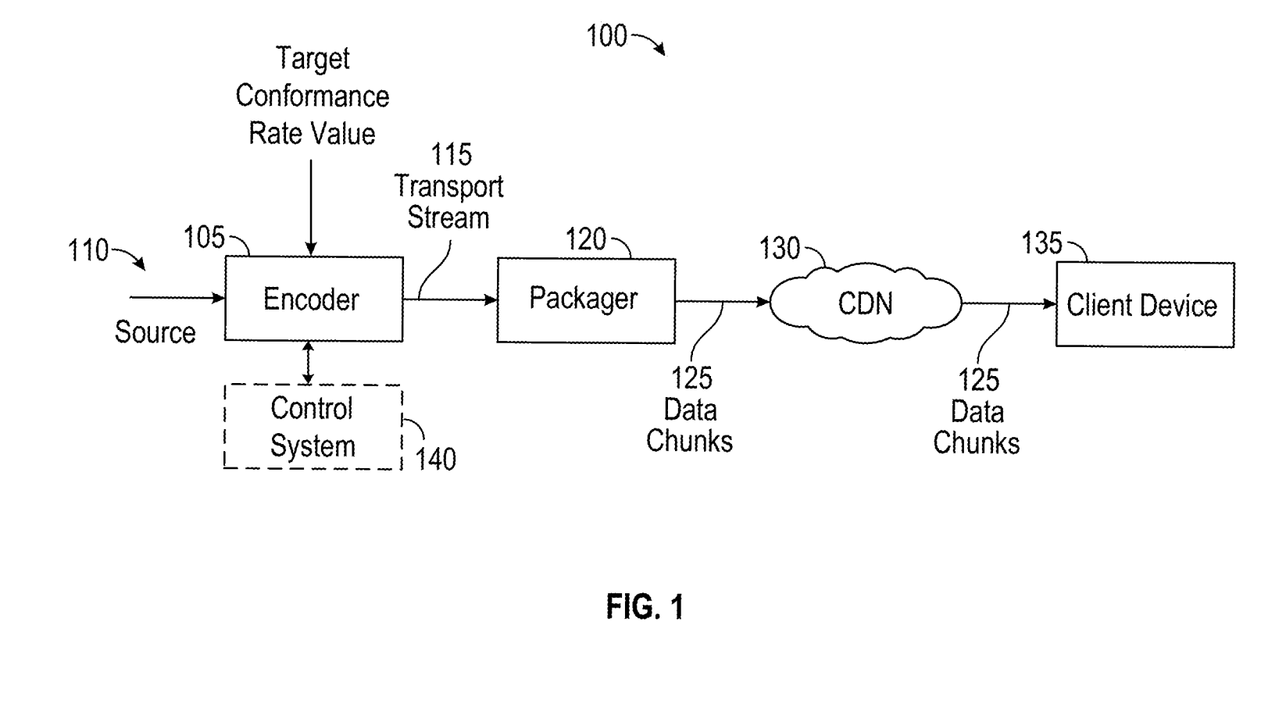
FIG. 1 is a block diagram of an operating environment for providing constant quality video encoding with encoding parameter fine-tuning.

FIG. 1 is a block diagram of an operating environment 100 for providing constant quality video encoding with encoding parameter fine-tuning. As shown in FIG. 1, operating environment 100 may comprise an encoder 105, a source 110, a transport stream 115, a packager 120, data chunks 125, a Content Delivery Network (CDN) 130, a client device 135, and a control system 140. Encoder 105, packager 120, client device 135, or control system 140 may be embodied by a computing device 500 described in greater detail below with respect to FIG. 5. Notwithstanding, encoder 105, packager 120, client device 135, or control system 140 may be embodied in hardware and/or in software (including firmware, resident software, micro-code, etc.). Client device 135 may comprise, but is not limited to, a cellular base station, a tablet device, a mobile device, a smartphone, a telephone, a remote control device, a set-top box, a digital video recorder, a cable modem, a personal computer, a network computer, a mainframe, a router, or other similar microcomputer-based device. CDN 130 may comprise a collection of web servers and network components for example.

ABR video, audio, and metadata may be packaged in small media files (e.g., chunks) that may have a fixed duration (e.g., 2 s). Each ABR chunk may be fully decodable on its own (i.e., it may not use previous chunks for decoding). Audio and video that may be contained in an ABR chunk and may be aligned (i.e., a first audio sample in the chunk may correspond to a first video sample in the chunk). With ABR, a single video/audio source may be encoded in multiple representations that may have different resolutions, framerates, and/or bitrates. Each of these representations may be separated into individually decodable chunks. Moreover, the chunk boundaries may be aligned (i.e., the corresponding chunks of the individual representations may start with the same video frame/audio sample). Aligning the chunk boundaries may allow an ABR client to switch between the available representations at the chunk boundaries. This may allow the ABR client to switch to an appropriate representation based on the network bandwidth it has available at a certain moment of time. When the ABR client has a high network bandwidth available, it may switch to a representation that may have a higher video resolution, framerate, and bitrate. When the available bandwidth is lower, the ABR client may switch to a representation with a lower video resolution, framerate, and bitrate.

In order for the ABR client to switch between the available representations at the chunk boundaries, the chunks of the individual representations may be video frame aligned (and within a chunk, audio may be aligned with video).

Consequently, services may be encoded by encoder 105, packaged (i.e., cut in data chunks 125) by packager 120, and delivered to client device 135 over CDN 130. Encoder 105 may encode source 110 to a video/audio format that may be used and may generate a set of representations of the ABR service (e.g., different resolutions, framerates, and bitrates). Encoder 105 may also determine the chunk size and chunk alignment by inserting Encoder Boundary Points (EBPs) into transport stream 115. These EBPs may be inserted, for example, at regular intervals (e.g., 2 s) on the video Packet Identifier (PID) (alternatives are possible depending on the ABR format).

Figure 2:
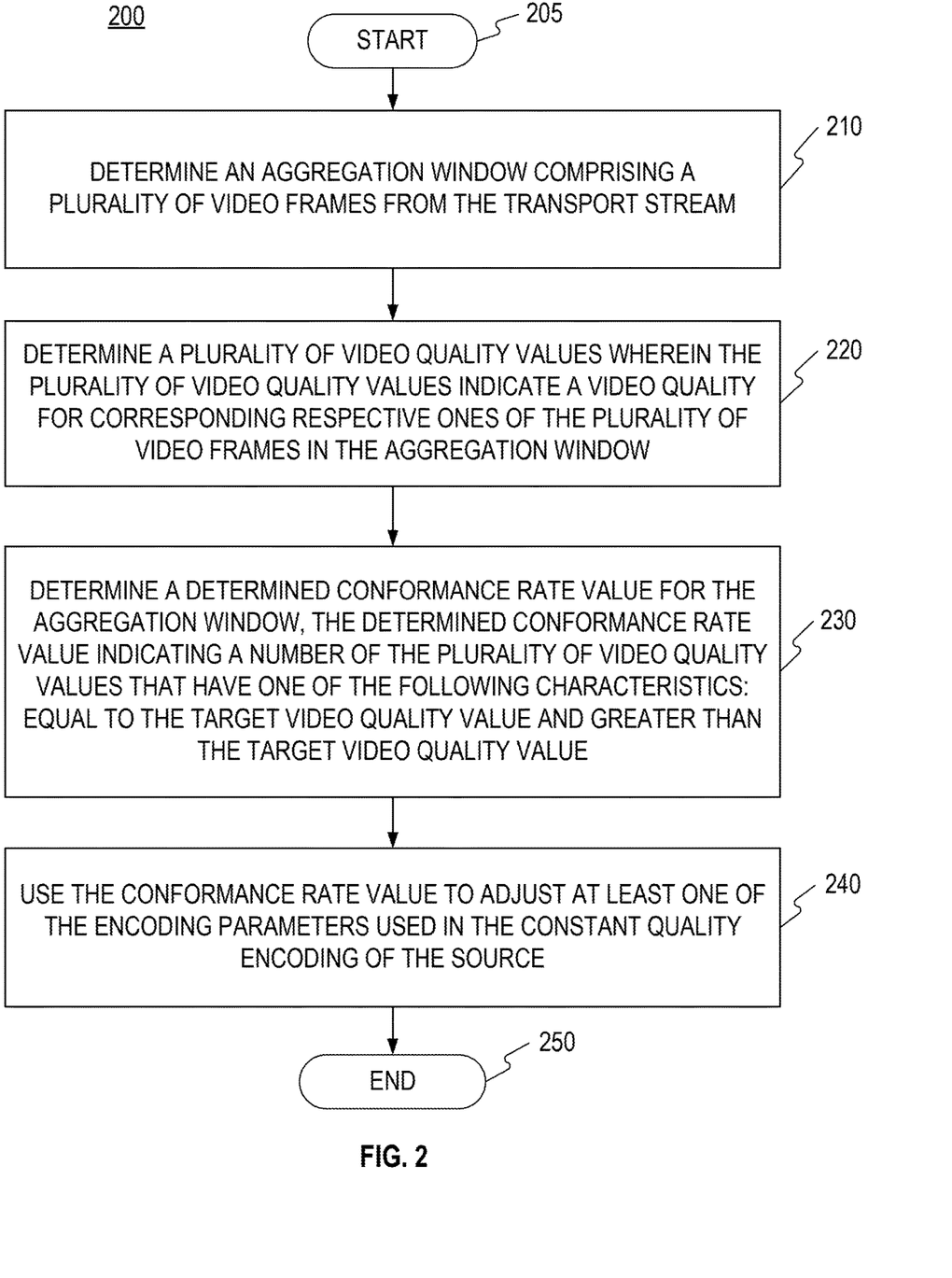
FIG. 2 is a flow chart of a method for providing constant quality video encoding with encoding parameter fine-tuning.

FIG. 2 is a flow chart setting forth the general stages involved in a method 200 consistent with an embodiment of the disclosure for providing constant quality video encoding with encoding parameter fine-tuning. For example, encoder 105 may receive source 110 and then create transport stream 115 from source 110. Creating transport stream 115 by encoder 105 may comprise constant quality encoding source 110 based on encoding parameters. The encoding parameters may comprise, but are not limited to, a target video quality value and a bitrate cap value. Constant quality encoding source 110 may comprise adjusting at least one of the encoding parameters using method 200 described below. Method 200 may be implemented using encoder 105 as described in more detail above with respect to FIG. 1. Some or all of the stages of method 200 may be performed by control system 140. Ways to implement the stages of method 200 will be described in greater detail below.

Method 200 may begin at starting block 205 and proceed to stage 210 where encoder 105 may determine an aggregation window comprising a plurality of video frames from transport stream 115. For example, encoder 105 may receive initial values for the encoding parameters (i.e., the target video quality value and the bitrate cap value) and begin CQ encoding source 110 into frames. The aggregation window comprising the plurality of video frames may comprise any time period and the plurality of video frames from transport stream 115 within the aggregation window may comprise any number of frames.

From stage 210, where encoder 105 determines the aggregation window comprising the plurality of video frames from transport stream 115, method 200 may advance to stage 220 where encoder 105 may determine a plurality of video quality values. The plurality of video quality values may indicate a video quality for corresponding respective ones of the plurality of video frames in the aggregation window. For example, the video content of source 110 may vary over time between easy to encode and difficult to encode (i.e., change from an easy video content source (e.g., a newsreader) to a more challenging video content source (e.g., a sports game) or vice versa) and gradations between. While performing the CQ encoding, encoder 105 may provide statistics on the encoding process. These statistics may comprise the actual video quality values (i.e., the plurality of video quality values) corresponding to ones of the plurality of video frames in the aggregation window.

Once encoder 105 determines the plurality of video quality values in stage 220, method 200 may continue to stage 230 where encoder 105 may determine a determined conformance rate value for the aggregation window. The determined conformance rate value may indicate a number of the plurality of video quality values that have the following characteristics: equal to the target video quality value or greater than the target video quality value. In other words, the determined conformance rate value may comprise the number of frames in the plurality of video frames in the aggregation window that have a corresponding video quality that meets or exceeds the target video quality value of the CQ encoding in the aggregation window. Because the video content of source 110 may vary over time between easy to encode and difficult to encode, the determined conformance rate value may depend on the aggregation window over which it is determined.

After encoder 105 determines the determined conformance rate value for the aggregation window in stage 230, method 200 may proceed to stage 240 where encoder 105 may use the conformance rate value to adjust at least one of the encoding parameters used in the constant quality encoding of source 110. For example, after encoder 105 has started CQ encoding using the initial encoding parameters, embodiments of the disclosure may fine-tune (i.e., adjust) at least one of the encoding parameters to reach a pre-defined goal (i.e., a target conformance rate) as described in more detail below. The target conformance rate may be expressed as a threshold on the number of frames in the plurality of video frames in the aggregation window that have a video quality that meets or exceeds the target video quality value of the CQ encoding in the aggregation window. The target conformance rate may be expressed in percent. For example, a target conformance rate of 80% may mean that 80% of the encoded video frames in the aggregation window may have a video quality that meets or exceeds the target video quality value.

At start-up of the CQ encoding by encoder 105, the aggregation window is filled with per-frame actual video quality values before the determined conformance rate may be determined. From then onwards, the aggregation window may be updated at regular intervals (e.g., every 5 minutes) as a sliding window (i.e., exclude the first set of per-frame actual video quality samples in the window and add the newest set of per-frame actual video quality samples). When the target video quality value or the bitrate cap value are changed by the fine-tuning process because the target conformance rate is not met, the aggregation window is flushed and the filling of the window with new data samples is restarted. Once encoder 105 adjust the at least one of the encoding parameters used in the constant quality encoding of source 110 in stage 240, method 200 may then end at stage 250.

As stated above, there may be at least two use-cases for providing constant quality video encoding with encoding parameter fine-tuning (i.e., adjusting) consistent with embodiments of the disclosure. In the first use-case (FIG. 3), the bitrate cap value may be fixed (e.g., user configuration) and the target video quality value may be adjusted. With the second use-case (FIG. 4), the target video quality value may be fixed (e.g., user configuration) and the bitrate cap value may be adjusted. These two use-cases are discussed below.

First Use-Case

At the start of the first-use case (FIG. 3), the following parameters may be provided to encoder 105: i) the bitrate cap value; ii) the target conformance rate (e.g., 80%); and iii) the aggregation window size (e.g., 6 hours) (stage 310). An initial target video quality value may also be determined (stage 315). The target conformance rate and the aggregation window size may be fixed parameters that may be used for channels in source 110. The value of the target conformance rate may impact both the resulting video quality at the output of encoder 105 and the bandwidth savings that may result from CQ encoding in the following ways: i) for a given bitrate cap value, a higher target conformance rate value may be met by lower video quality targets, which means the resulting video quality of the channel may be lower and the bandwidth savings may increase; and ii) for a given bitrate cap value, a lower target conformance rate value may be met by higher video quality targets, which means the video quality of the channel may be higher and the bandwidth savings may decrease.

Figure 3:
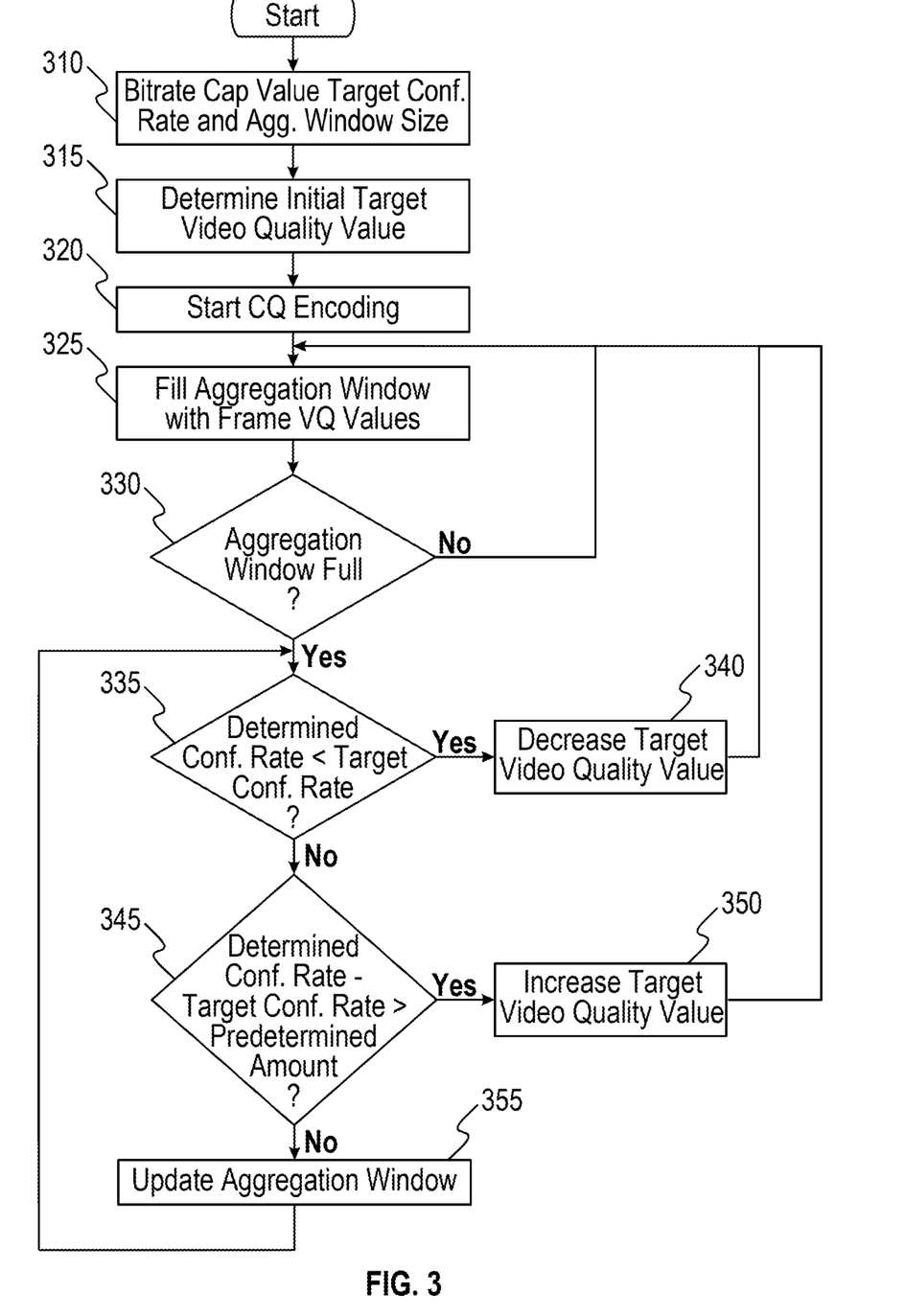
FIG. 3 is a flow chart of a first use-case.
Figure 4:
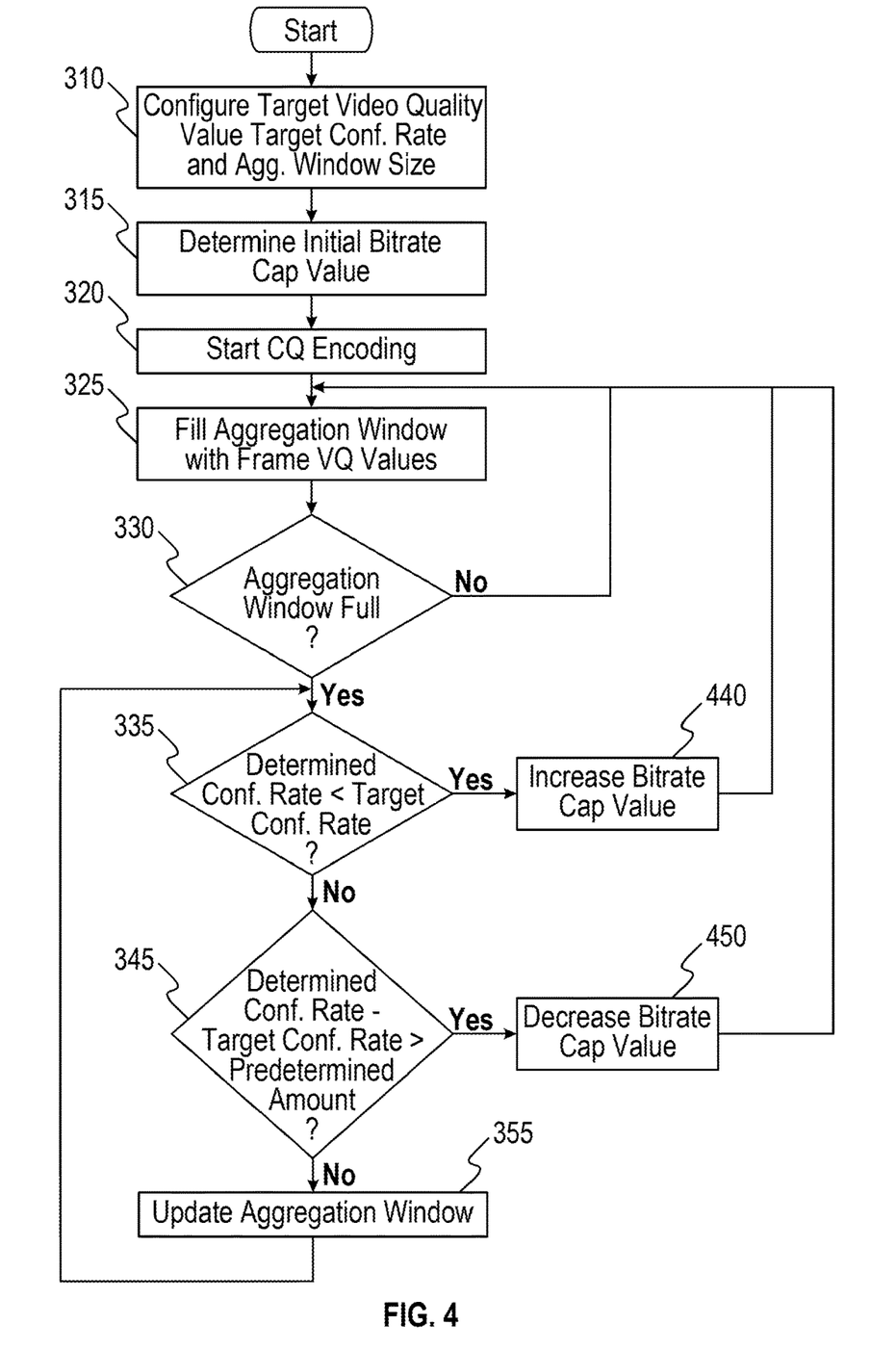
FIG. 4 is a flow chart of a second use-case.

After start of the CQ encoding (stage 320), encoder 105 may provide actual per-frame video quality values (i.e., the plurality of video quality values) (stage 325). These values may then be used to determine the determined conformance rate of encoder 105. As long as the aggregation window is not completely filled with actual video quality samples, encoder 105 may continue to operate at the initial target video quality value and a bitrate cap values. When the aggregation window is filled with frame video quality samples (stage 330), the determined conformance rate may be determined.

If the determined conformance rate is lower than the target conformance rate (stage 335), the current target video quality value may be too high for this video channel and may be decreased (stage 340). For example, the target video quality value may be lowered (e.g., by 1) and the aggregation window may be reset and the cycle may restart.

If the difference between the determined conformance rate and the target conformance rate is greater than a predetermined amount (e.g., 5%) (stage 345), the target video quality value may be too low since the determined conformance rate is too large. In response, the target video quality value may be increased (e.g., by 1) (stage 350) and the aggregation window may be reset and the cycle may restart. A given target conformance rate may be met with different target video quality value, but it is desirable to have the determined conformance rate to be as close as possible to the target conformance rate because this may provide that a high target video quality value may be used resulting in a corresponding high video quality output from encoder 105.

If the determined conformance rate is higher than the target conformance rate and if the determined conformance rate is not higher than a predestined amount (e.g., 5%) of the target conformance rate, the process for providing constant quality video encoding with encoding parameter fine-tuning may go into a steady-state (stage 355). In this steady-state, the aggregation window may go into a sliding window mode as described above and the target video quality value may stay unadjusted until the determined conformance rate goes beyond the aforementioned limits.

Second Use-Case

The second use-case (FIG. 4) is similar to the first use-case (FIG. 3), but with the following differences. In the second use-case, the value of the target conformance rate may affect both the resulting video quality at the output of encoder 105 and a bandwidth savings that may result from CQ encoding in the following way. First, for a given target video quality value, a higher target conformance rate may be met with higher bitrate cap values (stage 440), which means the resulting video quality of the channel at the output of encoder 105 may be higher and the required bandwidth may increase. Second, for a given target video quality value, a lower target conformance rate may also be met with lower bitrate cap values (stage 450), which means the video quality of the channel at the output of encoder 105 may be lower and the required bandwidth may decrease.

Figure 5:
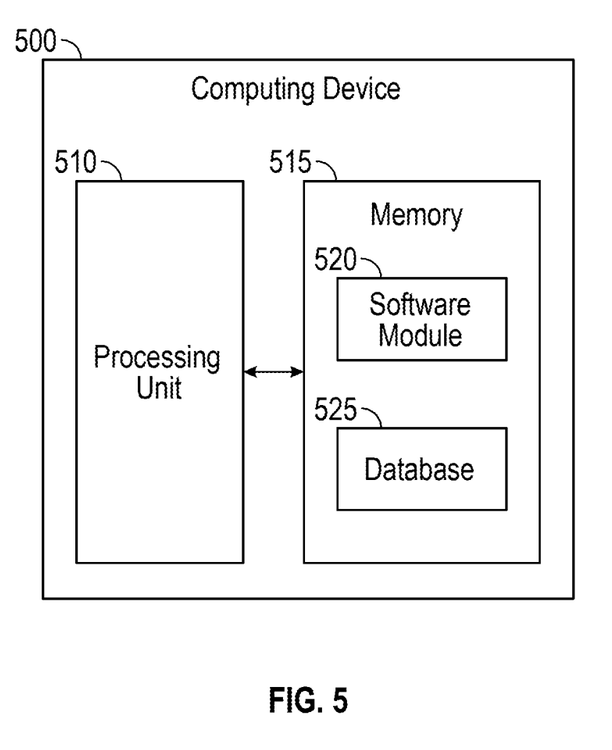
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform processes for providing constant quality video encoding with encoding parameter fine-tuning, including for example, any one or more of the stages from method 200 described above with respect to FIG. 2. Computing device 500 may provide an operating environment for any one or more of encoder 105, packager 120, client device 135, and encoder 140. Encoder 105, packager 120, client device 135, and encoder 140 may operate in other environments and are not limited to computing device 500.

Computing device 500 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a camera, a load balancer or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, by an encoder, a source; and
   constant quality encoding the source based on encoding parameters comprising a target video quality value and a bitrate cap value, wherein constant quality encoding the source comprises adjusting at least one of the encoding parameters, and wherein adjusting the at least one of the encoding parameters comprises:
      determining an aggregation window comprising a plurality of video frames from a transport stream created from the source,
      determining a plurality of video quality values, wherein the plurality of video quality values indicate a per-frame video quality value for each of the plurality of video frames in the aggregation window,
      determining a conformance rate value for the aggregation window, the conformance rate value indicating a number of the plurality of video quality values that have one of the following characteristics: equal to the target video quality value and greater than the target video quality value, and
      adjusting, based on the conformance rate value, the at least one of the encoding parameters used in the constant quality encoding of the source, wherein adjusting, based on the conformance rate value, the at least one of the encoding parameters comprises adjusting, based on the conformance rate value, the at least one of the encoding parameters to meet the conformance rate value for a predetermined number of video frames of the plurality of video frames of the aggregation window.

2. The method of claim 1, wherein determining the aggregation window comprises determining the aggregation window comprising a predetermined amount of time of the transport stream.

3. The method of claim 1, wherein adjusting, based on the conformance rate value, the at least one of the encoding parameters used in the constant quality encoding of the source comprises decreasing the target video quality value when the determined conformance rate value is less than a target conformance rate.

4. The method of claim 1, wherein adjusting, based on the conformance rate value, the at least one of the encoding parameters used in the constant quality encoding of the source comprises increasing the target video quality value when the determined conformance rate value minus a target conformance rate is greater than a predetermined value and when the determined conformance rate value is one of the following: greater than the target conformance rate and equal to the target conformance rate.

5. The method of claim 1, wherein adjusting, based on the conformance rate value, the at least one of the encoding parameters used in the constant quality encoding of the source comprises increasing the bitrate cap value when the determined conformance rate value is less than a target conformance rate.

6. The method of claim 1, wherein adjusting, based on the conformance rate value, the at least one of the encoding parameters used in the constant quality encoding of the source comprises decreasing the bitrate cap value when the determined conformance rate value minus a target conformance rate is greater than a predetermined value and when the determined conformance rate value is one of the following: greater than the target conformance rate and equal to the target conformance rate.

7. The method of claim 1, further comprising receiving an initial value for the target video quality value and an initial value for the bitrate cap value.

8. A system comprising:
   a memory storage; and
   a processing unit coupled to the memory storage, wherein the processing unit is operative to:
      receive a source; and
      constant quality encode the source based on encoding parameters comprising the following: a target video quality value and a bitrate cap value, wherein the processing unit being operative to constant quality encode the source comprises the processing unit being operative to adjust at least one of the encoding parameters, and wherein the processing unit being operative to adjust the at least one of the encoding parameters comprises the processing unit being operative to:
         determine an aggregation window comprising a plurality of video frames from a transport stream created from the source,
         determine a plurality of video quality values, wherein the plurality of video quality values indicate a per-frame video quality value for each of the plurality of video frames in the aggregation window,
         determine a conformance rate value for the aggregation window, the conformance rate value indicating a number of the plurality of video quality values that have one of the following characteristics: equal to the target video quality value and greater than the target video quality value, and
         adjust, based on the conformance rate value, the at least one of the encoding parameters used in the constant quality encoding of the source, wherein the processing unit being operative to adjust, based on the conformance rate value, the at least one of the encoding parameters comprises the processing unit being operative to adjust, based on the conformance rate value, the at least one of the encoding parameters to meet the determined conformance rate value for a predetermined number of video frames of the plurality of video frames of the aggregation window.

9. The system of claim 8, wherein the processing unit being operative to determine the aggregation window comprises the processing unit being operative to determine the aggregation window comprising a predetermined amount of time of the transport stream.

10. The system of claim 8, wherein the processing unit being operative to adjust, based on the conformance rate value, the at least one of the encoding parameters used in the constant quality encoding of the source comprises the processing unit being operative to decrease the target video quality value when the determined conformance rate value is less than a target conformance rate.

11. The system of claim 8, wherein the processing unit being operative to adjust, based on the conformance rate value, the at least one of the encoding parameters used in the constant quality encoding of the source comprises the processing unit being operative to increase the target video quality value when the determined conformance rate value minus a target conformance rate is greater than a predetermined value and when the determined conformance rate value is one of the following: greater than the target conformance rate and equal to the target conformance rate.

12. The system of claim 8, wherein the processing unit being operative to adjust, based on the conformance rate value, the at least one of the encoding parameters used in the constant quality encoding of the source comprises the processing unit being operative to increase the bitrate cap value when the determined conformance rate value is less than a target conformance rate.

13. The system of claim 8, wherein the processing unit being operative to adjust, based on the conformance rate value, the at least one of the encoding parameters used in the constant quality encoding of the source comprises the processing unit being operative to decrease the bitrate cap value when the determined conformance rate value minus a target conformance rate is greater than a predetermined value and when the determined conformance rate value is one of the following: greater than the target conformance rate and equal to the target conformance rate.

14. A non-transitory computer-readable medium that stores a set of instructions which when executed perform a method executed by the set of instructions comprising:
receiving a source; and
constant quality encoding the source based on encoding parameters comprising the following: a target video quality value and a bitrate cap value, wherein constant quality encoding the source comprises adjusting at least one of the encoding parameters, and wherein adjusting the at least one of the encoding parameters comprises:
determining an aggregation window comprising a plurality of video frames from a transport stream created from the source,
determining a plurality of video quality values wherein the plurality of video quality values indicate a per-frame video quality value for each of the plurality of video frames in the aggregation window,
determining a conformance rate value for the aggregation window, the conformance rate value indicating a number of the plurality of video quality values that have one of the following characteristics: equal to the target video quality value and greater than the target video quality value, and
adjusting, based on the conformance rate value, the at least one of the encoding parameters used in the constant quality encoding of the source, wherein adjusting, based on the conformance rate value, the at least one of the encoding parameters comprises adjusting, based on the conformance rate value, the at least one of the encoding parameters to meet the determined conformance rate value for a predetermined number of video frames of the plurality of video frames of the aggregation window.

15. The non-transitory computer-readable medium of claim 14, wherein determining the aggregation window comprises determining the aggregation window comprising a predetermined amount of time of the transport stream.

16. The non-transitory computer-readable medium of claim 14, wherein adjusting, based on the conformance rate value, the at least one of the encoding parameters used in the constant quality encoding of the source comprises decreasing the target video quality value when the determined conformance rate value is less than a target conformance rate.

17. The non-transitory computer-readable medium of claim 14, wherein adjusting, based on the conformance rate value, the at least one of the encoding parameters used in the constant quality encoding of the source comprises increasing the target video quality value when the determined conformance rate value minus a target conformance rate is greater than a predetermined value and when the determined conformance rate value is one of the following: greater than the target conformance rate and equal to the target conformance rate.

18. The non-transitory computer-readable medium of claim 14, wherein adjusting, based on the conformance rate value, the at least one of the encoding parameters used in the constant quality encoding of the source comprises increasing the bitrate cap value when the determined conformance rate value is less than a target conformance rate.

19. The non-transitory computer-readable medium of claim 14, wherein adjusting, based on the conformance rate value, the at least one of the encoding parameters used in the constant quality encoding of the source comprises decreasing the bitrate cap value when the determined conformance rate value minus a target conformance rate is greater than a predetermined value and when the determined conformance rate value is one of the following: greater than the target conformance rate and equal to the target conformance rate.

20. The non-transitory computer-readable medium of claim 14, further comprising receiving an initial value for the target video quality value and an initial value for the bitrate cap value.

* * * * *